United States Patent Office 3,449,474
Patented June 10, 1969

3,449,474
O,O-DIETHYL-S-(METHYLTHIOPROPYL) DITHIOPHOSPHATE
Karl Griesbaum, Elizabeth, Alexis A. Oswald, Mountainside, and Daniel Noyes Hall, Linden, N.J., assignors to Esso Research and Engineering Company, a corporation of Delaware
No Drawing. Filed May 18, 1964, Ser. No. 368,351
Int. Cl. C07f 9/16; C07c 149/10; A01n 9/36
U.S. Cl. 260—948     1 Claim

ABSTRACT OF THE DISCLOSURE

Unsymmetrical 1,3-bis-(substituted mercapto)-propanes are prepared by a free radical reaction involving a critical sequential addition of two different thiols to allene. Diadducts formed with a dialkyl dithiophosphoric acid as one thiol reactant and an alkyl or aryl thiol as the other thiol reactants have been found to be effective agricultural chemicals. The order of addition of the thiols to the allene is dictated by their respective hydrogen donor abilities with the thiol of lower ability being added in the first stage.

---

This invention relates to a novel method for preparing thiol diadducts of allene and to the utilization of certain products of this process as novel pesticidal compositions. More particularly, this invention relates to the synthesis of unsymmetrical 1,3-bis-(substituted mercapto)-propanes by sequential addition of different thiols to allene and to the use of certain products of this process as novel insecticides, miticides and nematocides.

In a copending patent application, by the same inventors, Ser. No. 368,345, filed May 18, 1964, now U.S. 3,398,200, a process for the selective synthesis of monoadduct allyl sulfides by the reaction of allene with a thiol, is described. It was found that certain products of this reaction possessed valuable pesticidal properties. The discovery that selected monoadducts possessed these pesticidal properties has stimulated interest in methods of preparing and utilizing thiol diadducts, particularly, those adducts containing dissimilar thiol groups, derived from the monoadduct allyl sulfides.

It is, therefore, an object of this invention to provide a novel process for producing unsymmetrical thiol diadducts of allene.

Yet another object of this invention is to provide novel pesticidal compositions containing the unsymmetrical thiol diadducts of allene.

It has now been discovered that the sequential addition of different thiols to allene can result in low yields of the desired unsymmetrical thiol diadduct unless the reaction is carried out under certain critical conditions. More specifically, it has now been discovered that the order of addition of thiols to allene by a free-radical mechanism is a critical factor in obtaining quantitative yields of the desired unsymmetrical product. Furthermore, it has now been found that selected unsymmetrical products of the reaction, particularly those compounds which are prepared by utilizing dialkyl-dithiophosphoric acid as one of the thiol reactants, possess properties which make them suitable for use as agricultural chemicals.

The reaction contemplated by this invention may be represented as follows:

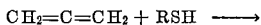
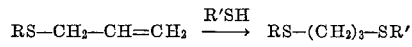

The thiol-containing reactants RSH and R'SH which are employed in the above reaction are different members of the group of compounds wherein R and R' are organic radicals containing 1 to 30 carbon atoms which may be defined as follows:

R=$C_1$ to $C_{20}$, preferably $C_1$ to $C_{10}$, alkyl group, e.g., methyl, ethyl, sec. butyl,
or R=$C_4$ to $C_{20}$, preferably $C_4$ to $C_{10}$, heterocyclic group, e.g., benzothiazyl, pyridyl,
or R=$C_6$ to $C_{14}$, preferably $C_6$ to $C_{12}$, aryl group, e.g., phenyl, naphthyl, phenanthryl,
or R=$C_7$ to $C_{30}$, preferably $C_7$ to $C_{15}$, alkylaryl group, e.g., nonylphenyl, xylyl,
or R=$C_7$ to $C_{30}$, preferably $C_7$ to $C_{15}$ arylalkyl group, e.g., benzyl, phenylisopropyl,
or R=$C_1$ to $C_{30}$, preferably $C_1$ to $C_{10}$ substituted alkyl group, e.g., aminoethyl, hydroxyethyl, mercaptoethyl, carboxyethyl chloroethyl, etc.,
or R=$C_6$ to $C_{30}$, preferably $C_7$ to $C_{15}$ substituted aryl or alkylaryl group, e.g., halophenyl, nitrotolyl, aminophenyl,
or R=$C_1$ to $C_{20}$, preferably $C_1$ to $C_{10}$ acyl group, e.g. acetyl, propionyl, lauroyl,
or R=a dihydrocarbylthiophosphoryl group having the structure

wherein X and X' are $C_1$ to $C_{18}$, preferably $C_1$ to $C_{10}$ hydrocarbyl radicals, e.g., alkyl, alkenyl, aryl or alicyclic. Particularly, preferred are the lower alkyls such as $C_1$ to $C_3$ alkyl groups.

The preferred reactants for the process of this invention are the above described dihydrocarbylthiophosphoryl reactants wherein X and X' are $C_1$ to $C_3$ alkyl groups in combination with the $C_1$ to $C_4$ alkyl thiols such as methanethiol or the $C_6$ to $C_9$ arylthiols and haloarylthiols such as benzenethiol or p-chlorobenzenethiol. These reactants are preferred since they lead to the production of mixed diadducts having the structure

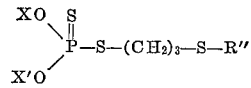

wherein R″ is an alkyl, aryl or substituted aryl group. These latter compounds have been found to possess desirable pesticidal properties.

It has been found that due to the nature of the above-described reactants and reaction, the second step of the reaction may result in the formation of a symmetrical diadduct in preference to the desired mixed diadduct due to a phenomenon known as allylic reversal. It has now been discovered that this tendency to form the symmetrical diadduct is dependent upon the relative hydrogen donor ability of the thiol reactants. The utilization of the thiol having the better hydrogen donor ability, of the two thiol reactants, in the second step of the reaction is critical to the formation of good yields of the desired mixed diadduct.

The relative hydrogen donor ability of a particular thiol reactant may be determined by reference to the chemical literature on chain transfer constants in polymerization reactions since the chain transfer constant is directly proportional to hydrogen donor ability. One method of determining chain transfer constants for thiols is described by J. L. O'Brien and F. Gornick, J. Am. Chem. Soc. 77, 4757 (1955). This method involves a mathematical determination of the chain transfer constant from data on monomer and thiol concentrations and degree of polymerization in a free radical initiated polymerization reaction. Alternatively, hydrogen donor ability may be measured by the ease with which 2-cyano-2 propyl radicals will abstract hydrogen from RSH as determined by the yield of RSSR dimer which is produced by combination of the thiyl radicals after hydrogen abstraction. This latter method is more fully described by P. Bruin et al., 71, Recueil, 1115 (1952).

As previously described in this specification, the two-step reaction contemplated by this invention involves a free-radical reaction between allene and the respective thiols. Such free-radical reactions are normally carried out in the presence of a free-radical type initiator such as ultraviolet light, gamma radiation or a wide variety of peroxidic and azo compounds. Typical examples of the latter compounds are cumene hydroperoxide, tertiary butyl hydroperoxide, bis-tertiary butyl peroxide and bis-azo-isobutyronitrile. The free-radical initiators may be employed alone or in combination with other free-radical initiators, e.g., a combination of ultraviolet light and an azo or peroxidic compound.

A wide variety of reaction conditions may be employed in the process of this invention. Suitable reaction temperatures for both steps of the reaction are in the range of $-100$ to $+150°$ C., preferably $-40$ to $+100°$ C., e.g., $-30°$ C. The reaction pressure is not critical and superatmospheric as well as atmospheric pressures may be employed in the reaction. Typical reaction pressures are in the range of 0 to 750 p.s.i.g. and preferably 14 to 150 p.s.i.g., e.g., 50 p.s.i.g.

The ratio of reactants is a critical feature of this invention. The first step of the reaction which involves the addition of a thiol of relatively lower hydrogen donor ability, as compared to the second step thiol addition, to allene must be carried out under conditions which favor the formation of the allyl sulfide monoadduct since it is also possible to form a symmetrical thiol diadduct during this step. The formation of the allyl sulfide monoadduct is favored by employing an excess of allene in the reaction. Molar ratios of allene to thiol should be maintained in the range of 2:1 to 10:1 and preferably 3:1 to 5:1.

The second stage of the reaction which involves the addition of a thiol of relatively higher hydrogen donor ability, as compared to the first addition step, has been found to be favored by employing a molar excess of the thiol reactant. While equimolar amounts of reactants may be employed, molar ratios of thiol to allylsulfide in the range of 3:2 to 10:1 and preferably 3:1 to 5:1 should be employed in the second stage of the reaction.

While the invention has been described with respect to a preferred two-step reaction involving the addition of a thiol to allene in the first step, it will be understood by those skilled in the art that the preparation of the monoadduct may be carried out by any conventional method known in the prior art and that the manner of preparing the monoadduct is limited only by the configuration of the desired diadduct, i.e., the thiyl group of the monoadduct must be of lower hydrogen donor ability than the thiyl group to be added in the free-radical addition to form the diadduct.

The invention will be further understood by reference to the following illustrative examples.

EXAMPLE 1

A mixture of 5.5 grams (0.05 mole) of benzenethiol and 5.1 grams (0.05 mole) of allyl ethyl sulfide was irradiated with ultraviolet light in a quartz tube at 20° C. for 6 hours. Analysis of the reaction mixture by gas-liquid chromatography and nuclear-magnetic resonance showed that the mixed diadduct 1-ethylmercapto-3-phenyl-mercaptopropane constituted 89 mole percent of the product mixture. The other identifiable reaction products were allyl phenyl sulfide and 1,3-bis-phenylmercaptopropane.

In a series of reactions identical to that described above, allyl ethyl sulfide was reacted with n-propyl mercaptan, isobutyl mercaptan and tertiary butyl mercaptan. The results are summarized in Table I.

TABLE I

| RSH | Mole percent mixed di-adduct in product mixture | Chain transfer constant [1] |
| --- | --- | --- |
| PhS— | 89 | 2.7 |
| $CH_3CH_2CH_2S$— | 65 | (²) |
| $(CH_3)_2CHS$— | 58 | 0.38 |
| $(CH_3)_3CS$— | 50 | 0.18 |

[1] J. O'Brien and F. Gornick, J.A.C.S., 77, 4757 (1955).
[2] $CH^3CH^2CH^2CH^2SH$ has a constant of 0.66.

These results show that the reaction selectivity towards the mixed diadduct increases with the hydrogen donor ability of the adding thiol as measured by chain transfer data for thiols taken from the literature.

EXAMPLE 2

A mixture of 1.2 g. (0.02 m) of ethanethiol and 3.0 g. (0.02 m) of allyl phenyl sulfide were irradiated with U.V. for 385 minutes at 17–20° C. Analysis by gas-liquid chromatography showed that the product mixture contained only 6 mole percent of the 1,3-mixed diadduct 1-ethylmercapto-3-phenylmercapto-propane. The over-all conversion of the reaction was 40% with the other products being ethyl allyl sulfide, 1,3-bis-(ethylmercapto)-propane and 1,3-bis-(phenylmercapto)-propane.

Similar experiments were carried out adding ethanethiol to n-propyl allyl sulfide, isopropyl allyl sulfide and tertiary butyl allyl sulfide. The mole percent of the mixed diadduct in the product mixture in each case is shown in Table II.

TABLE II

Mole percent mixed diadduct in product mixture

| | |
| --- | --- |
| PhS— | 10 |
| $CH_3CH_2CH_2S$— | 63 |
| $(CH_3)_2CHS$— | 71 |
| $(CH_3)_3CS$— | 76 |

Comparison of Tables I and II shows that the order in which two different thiols are added to allene can have an effect on the over-all yield of mixed diadduct. The effect is great when the structures of the two thiols are very different, e.g., ethanethiol and benzenethiol. The effect is negligible with two thiols of very similar structure, e.g., n-propanethiol and ethanethiol. For practical use these results show that the poorer hydrogen donor of two thiols should be added first to allene to form an allyl sulfide.

EXAMPLE 3

A mixture of 2.2 g. (0.02 m) of benzenethiol and 1.02 g. (0.01 m) of allyl ethyl sulfide was irradiated in a quartz tube for 6.5 hours at 12–15° C. Gas liquid chromatographic analysis of the product showed 60% conversion occurred and that 95 mole percent of the product mixture was the mixed diadduct, 1-ethylmercapto-3-phenylmercapto-propane. The only other products were 1,3-bis-(ethylmercapto)-propane (ca. 1%) and allyl sulfide (4%). Similar experiments were carried out using reactant molar ratios of 5:1, 1:1, 1:2, and 1:5 benzenethiol to allyl ethyl sulfide. The results are shown in Table III and demonstrate that the larger the ratio of thiol to allyl sulfide the greater the reaction selectivity to the desired mixed diadduct.

TABLE III

| Reactant, moles | | Reactant molar ratio | Selectivity to diadduct |
| --- | --- | --- | --- |
| Benzene thiol | Allyl ethyl sulfide | | |
| 1 | 5 | 0.2 | 75 |
| 1 | 2 | 0.5 | 85 |
| 1 | 1 | 1.0 | 86 |
| 2 | 1 | 2.0 | 95 |
| 5 | 1 | 5.0 | 100 |

EXAMPLE 4

A mixture of 2.5 grams of allyl methyl sulfide and 5.3 grams of diethyldithiophosphoric acid was placed in a quartz reaction tube and irradiated with U.V. light at ambient temperature for a period of 31 hours. The reaction mixture was then dissolved in ether and washed with an aqueous 5% $Na_2CO_3$ solution to remove the unreacted acid. The solution was washed, dryed and distilled. The reaction product was analyzed and found to have the structure: $(C_2H_5O)_2PS_2(CH_2)_3$—$SCH_3$.

EXAMPLE 5

A mixture of 16.8 grams of diethyldithiophosphoric acid and 18.4 grams of allyl p-chlorophenyl sulfide was placed in a quartz reaction tube and irradiated with ultraviolet light for a period of 3 days at ambient temperature (approximately 20° C.). The reaction product was washed with a 5% aqueous $Na_2CO_3$ solution and dried over anhydrous $Na_2SO_4$. The product was analyzed by nuclear magnetic resonance and found to be:

$$(C_2H_5O)_2PS_2(CH_2)_3\text{—}S\text{—}C_6H_5Cl$$

EXAMPLE 6

Samples of the mixed diadducts described in Examples 4 and 5 were tested for insecticidal, miticidal and nematocidal activity. The tests were performed by the following general procedures:

0.1% concentration. These latter compounds are commercial miticides which are known to give 100% control at this concentration.

Nematocide screening

Samples are tested at 0.41 gram per gallon of soil equivalent to 100 lbs. per four inch acre. Nemagon, a commercial nematocide, is used as a positive control at a concentration of 40 lbs. per four inch acre. All samples are formulated into 10% dusts for mixture with soil.

Meloidogyne sp. nematodes are reared into tomato plant soil culture. Soil for test purposes is inoculated with infected soil and root knots from injected tomato plants. Uninoculated soil is employed for control and phytotoxic effects. Chemical dusts are blended thoroughly with the soil in a V-shell blender. Four one pint paper pots are used for each treatment with one tomato transplant per pot. After three to four weeks under artificial lighting and overhead irrigation, the roots of the plants are examined for degree of root knot formation. Inoculated controls normally have 80–100 root knots per plant. Percent control is recorded by comparison of the knot counts on treated and untreated tomato plants.

The results of these tests are summarized in the following table:

| Compound tested | Conc. percent W./V. | Percent mortality of— | | | Mites, spider mites | Percent control of root knot nematodes on tomato [1] |
| --- | --- | --- | --- | --- | --- | --- |
| | | Insects | | | | |
| | | Mexican bean beetles | Pea aphids | | | |
| | | | Contact | Systemic | | |
| $(C_2H_5O)_2\underset{\underset{S}{\|\|}}{P}\text{—}S\text{—}(CH_2)_3\text{—}SCH_3$ | 0.05 | 100 | 100 | 100 | 97 | 95 |
| | 0.25 | | | | 100 | |
| | 0.01 | | | | 90 | |
| $(C_2H_5O)_2\underset{\underset{S}{\|\|}}{P}\text{—}S\text{—}(CH_2)_3\text{—}S\text{—}$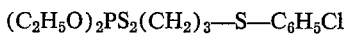$\text{—}Cl$ | 0.05 | 100 | 0 | 0 | 85 | 0 |

[1] Concentration: 100 lbs./4 in. acre.

Insecticide screening

Mexican bean beetle tests.—Lima bean leaves sprayed on the dorsal and ventral surface are offered to ten larvae of the Mexican bean beetle (late second instar) for a forty-eight hour feeding period. The feeding rate and mortality data are recorded as well as foliage injury, if any. The positive standards are 0.05% DDT and 0.1% methoxychlor, which are commercial insecticides known to give 100% control at these concentrations.

Pea aphid tests.—Adult pea aphids are sprayed and transferred to sprayed pea plants and held for forty-eight hour mortality determinations. Foliage injury, if any, is recorded. DDT at 0.05% concentration is used as the positive standard.

Systemic insecticidal activity is evaluated by applying 20 ml. of 0.01% concentration of the sample to the vermiculite substratum of potted pea plants. Forty-eight hours after application the plants are infested with ten adult pea aphids and mortality determination is made after five days. Demeton at 0.01% concentration, a commercial insecticide known to give 100% control at this concentration, is used as the positive standard.

Miticide screening

Spider mite tests.—Lima bean plants are infested with fifty to one hundred adults of the strawberry spider mite, *Tetranychus atlanticus*, prior to testing. The infested plants are dipped into the test material and held for five days. Adult mortality as well as ovicidal action is noted. Aramite and ovotran are used as positive standards at The nematocidal, insecticidal and miticidal compositions of this invention may be employed by either solid or liquid form. When used in solid form, they may be reduced to an impalpable powder and employed as an undiluted dust or they may be admixed with a solid carrier such as clay, talc or bentonite as well as other carriers known in the art. The compositions may also be applied as a spray in a liquid carrier either as a solution in a solvent or as a suspension in a nonsolvent, such as water. Typical solvents are organic compounds such as acetone, ethyl alcohol, benzene, naphtha, etc., although different compounds exhibit different solubilities for the novel compositions. In some instances, it may be preferable to admix the composition with wetting agents so as to be able to secure aqueous emulsions and consequent uniformity of dispersion in the resulting colloidal system. The use of these wetting agents also increases the spreading action of the spray by decreasing its surface tension. This results in the securing of better contact of the spray with the surface being treated and consequently brings the active ingredient into intimate contact with the parasite life. Suitable wetting agents include the sulfates of long-chain alcohols such as dodecanol and octadecanol, sulfonated amide and ester derivatives, sulfonated aromatic and mixed alkyl aryl derivatives, esters of fatty acid such as the ricinoleic esters of sorbitol and petroleum sulfonates of $C_{10}$ to $C_{20}$ lengths. The nonionic emulsifying agents such as the ethylene oxide condensation products of alkylated phenols may also be used. The compounds of this invention may also be admixed with carriers that are themselves active fungicidal and nematocidal compositions.

It is to be understood that the invention is not limited to the specific examples which have been offered merely as illustrations and that modifications may be made without departing from the spirit of the invention.

What is claimed is:
1. A composition of matter having the structure

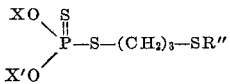

wherein X and X' are ethyl groups and R'' is a methyl group.

References Cited

UNITED STATES PATENTS 2,759,010  8/1956  Lorenz et al. _____ 260—948
2,793,224  5/1957  Fancher.
2,976,311  3/1961  Schrader _____ 260—949
3,004,980  10/1961 Schrader _____ 260—949 XR CHARLES B. PARKER, *Primary Examiner.*

ANTON H. SUTTO, *Assistant Examiner.*

U.S. Cl. X.R.

204—158; 260—294.8, 304, 399, 455, 570, 584, 601, 609, 632, 949, 978; 424—215